United States Patent
Song et al.

(10) Patent No.: US 8,854,756 B1
(45) Date of Patent: Oct. 7, 2014

(54) SYSTEMS AND METHODS FOR MITIGATING DATA INTERFERENCE IN A CONTACT SIGNAL

(71) Applicant: LSI Corporation, San Jose, CA (US)

(72) Inventors: Xiufeng Song, San Jose, CA (US); Jun Xiao, Fremont, CA (US); Jianzhong Huang, Storrs, CT (US); Lu Lu, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/894,723

(22) Filed: May 15, 2013

Related U.S. Application Data (60) Provisional application No. 61/822,125, filed on May 10, 2013.

(51) Int. Cl.
*G11B 5/09* (2006.01)
*G11B 5/60* (2006.01)

(52) U.S. Cl.
CPC .................................. *G11B 5/6076* (2013.01)
USPC .................... 360/39; 360/31; 360/53; 360/55

(58) Field of Classification Search
None
See application file for complete search history.

(56) References Cited

U.S. PATENT DOCUMENTS

| | | | |
|---|---|---|---|
| 4,715,257 A | 12/1987 | Hoshiai et al. | |
| 4,777,544 A | 10/1988 | Brown et al. | |
| 5,086,475 A | 2/1992 | Kutaragi et al. | |
| 5,111,727 A | 5/1992 | Rossum | |
| 5,377,058 A | 12/1994 | Good et al. | |
| 5,814,750 A | 9/1998 | Wang et al. | |
| 6,097,559 A | 8/2000 | Ottesen | |
| 6,191,901 B1 | 2/2001 | Carlson | |
| 6,519,102 B1 | 2/2003 | Smith et al. | |
| 6,937,424 B2 | 8/2005 | Chang et al. | |
| 7,016,131 B2 | 3/2006 | Liu et al. | |
| 7,038,875 B2 | 5/2006 | Lou et al. | |
| 7,158,325 B1 | 1/2007 | Hu et al. | |
| 7,222,289 B2 | 5/2007 | Hung | |
| 7,760,457 B1 * | 7/2010 | Gunderson et al. | 360/75 |
| 7,830,369 B2 | 11/2010 | Kageyama et al. | |
| 8,098,451 B2 | 1/2012 | Graef | |
| 8,145,443 B2 | 3/2012 | Kang et al. | |
| 8,296,638 B2 | 10/2012 | Derras | |
| 8,300,349 B2 | 10/2012 | Mathew et al. | |
| 2007/0268615 A1 | 11/2007 | McFadyen et al. | |
| 2008/0071367 A1 | 3/2008 | Bergin | |

(Continued)

FOREIGN PATENT DOCUMENTS

| | | |
|---|---|---|
| EP | 2031759 | 3/2004 |
| WO | WO 02/93546 | 11/2002 |
| WO | WO 2010/014078 | 2/2010 |

OTHER PUBLICATIONS

Fertner, Antoni "Frequency-Domain Echo Canceller With Phase Adjustment" IEEE Transactions on circuits and Systems-II; Analog and Digital Signal Processing, V. 44, No. 10, 10/9.

(Continued)

*Primary Examiner* — Muhammad N Edun
(74) *Attorney, Agent, or Firm* — Hamilton DeSanctis & Cha (57) ABSTRACT

The present inventions are related to systems and methods for determining contact between two elements, and more particularly to systems and methods for determining contact between a head assembly and a storage medium.

20 Claims, 7 Drawing Sheets

(56) References Cited

U.S. PATENT DOCUMENTS

| | | |
|---|---|---|
| 2008/0192379 A1 | 8/2008 | Kurita |
| 2008/0204924 A1* | 8/2008 | Ohno et al. .................. 360/75 |
| 2008/0239581 A1* | 10/2008 | Ikai et al. .................. 360/272 |
| 2012/0033323 A1 | 2/2012 | Mathew |
| 2012/0038998 A1 | 2/2012 | Mathew |
| 2012/0056612 A1 | 3/2012 | Mathew |
| 2012/0087035 A1 | 4/2012 | Graef |

OTHER PUBLICATIONS

Liu, et al., "Head Disk Spacing Variation Suppression via Active Flying Height Control" IEEE Instrumentation and Measurement Technology Conf. Budapest, Hungary May 21-23, 2001.

U.S. Appl. No. 13/537,487, Unpublished (filed Jun. 29, 2012) (Ming Jin).

U.S. Appl. No. 13/185,562, Unpublished (filed Jul. 19, 2011) (Haitao Xia).

* cited by examiner

SYSTEMS AND METHODS FOR MITIGATING DATA INTERFERENCE IN A CONTACT SIGNAL

CROSS REFERENCE TO RELATED APPLICATION

The present application claims priority to U.S. Pat. App. No. 61/822,125 entitled "Systems and Methods for Energy Based Head Contact Detection" and filed on May 10, 2013 by Song et al. The entirety of each of the aforementioned reference is incorporated herein by reference for all purposes.

FIELD OF THE INVENTION

The present inventions are related to systems and methods for determining contact between two elements, and more particularly to systems and methods for determining contact between a head assembly and a storage medium.

BACKGROUND

Typical implementations of hard disk based storage devices utilize a thermal element to control the fly height of the read/write head. Heating the thermal element causes a distance between the read/write head and a storage medium to decrease. Where the heat generated by the thermal element is sufficient, the read/write head may be brought into contact with the storage medium. In some cases, this contact can damage one or more components of the storage device.

Hence, for at least the aforementioned reason, there exists a need in the art for advanced systems and methods for determining contact between the read/write head and the storage medium.

BRIEF SUMMARY

The present inventions are related to systems and methods for determining contact between two elements, and more particularly to systems and methods for determining contact between a head assembly and a storage medium.

Various embodiments of the present invention provide storage devices that include: a read/write head assembly and an interference mitigated touch down circuit. The read/write head assembly is disposed in relation to a storage medium, and includes a sensor operable to provide a sensor output indicating contact between the read/write head assembly and the storage medium and a write head. The interference mitigated touch down circuit is operable to: estimate an interference in the sensor output from the write head; and remove the interference from the sensor output to yield a filtered output.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for determining contact between two elements, and more particularly to systems and methods for performing determining contact between a head assembly and a storage medium.

A hard disk interface ("HDI") sensor is included in the read/write head assembly near a write data signal generator. As the read/write head assembly flies close to the storage medium occasional contact between the read/write head assembly and the storage medium may occur. The occurrence of such contact is indicated by an output from the HDI sensor. As an example, the HDI sensor may be a thermally sensitive sensor that provides a current indicative of a contact or non-contact condition. In particular, where contact occurs, the temperature of the HDI sensor increases causing a change in the current. The current is processed to determine the occurrence of contact, but at times is inaccurate. As contact can lead to damage to one of both of the read/write head assembly, inaccuracy in the HDI sensor is undesirable.

Various embodiments of the present invention provide storage devices that include: a read/write head assembly and an interference mitigated touch down circuit. The read/write head assembly is disposed in relation to a storage medium, and includes a sensor operable to provide a sensor output indicating contact between the read/write head assembly and the storage medium and a write head. The interference mitigated touch down circuit is operable to: estimate an interference in the sensor output from the write head; and remove the interference from the sensor output to yield a filtered output. In some instances of the aforementioned embodiments, the storage device further includes the storage medium. In various instances of the aforementioned embodiments, the interference mitigated touch down circuit is implemented as part of a semiconductor device, and/or the storage device is a hard disk drive.

In one or more instances of the aforementioned embodiments, the interference mitigated touch down circuit is further operable to determine a contact between the storage medium and the read/write head assembly based on the filtered output, and to provide a contact output. In particular embodiments of the present invention, estimating the interference in the sensor output includes calculating a coherent output based upon two or more instance of the sensor output, and calculating a least mean squared value based at least in part on the coherent output. In some such instances, the coherent output is a running average of the two or more instances of the sensor output. In various such instances, estimating the interference in the sensor output further includes transforming the dimension of the coherent output from a first space to a second space. Calculating a least mean squared value is based at least in part on the coherent output transformed to the second space. In some cases, the first dimension is a power of P, and in one particular case, the value of P is nine. In one or more instances of the aforementioned embodiments, removing the interference from the sensor output includes subtracting the interference from the sensor output to yield the filtered output.

Figure 1:
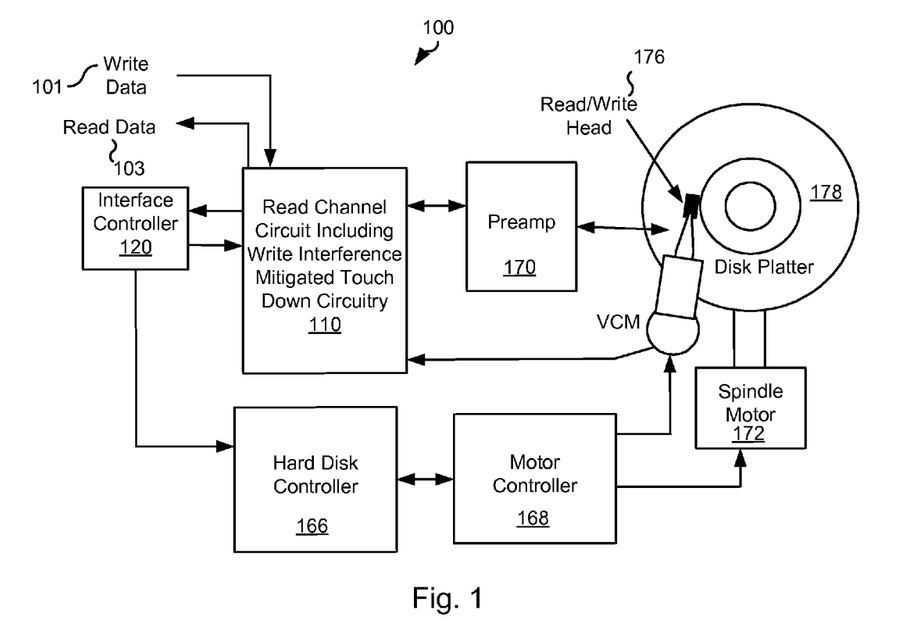
FIG. 1 shows a storage system including a read channel circuit having write interference mitigated touch down circuitry in accordance with various embodiments of the present invention.

Turning to FIG. 1, a storage system 100 including a read channel circuit 110 having write interference mitigated touch down circuitry in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

In addition to sensing data stored on disk platter 178, read/write head assembly 176 provides for sensing contact between read/write head assembly 176 and disk platter 178. Such sensing may be done by a write interference mitigated touch down circuit that receives a signal from a touch sensor, and filters any write data interference from the signal to yield a filtered signal. This filtered signal is then compared with a threshold value to yield a contact indication. In some cases, read channel circuit 110 is implemented similar to that disclosed in relation to FIG. 3a below and the write interference mitigated touch down circuit may be implemented similar to that disclosed below in relation to FIG. 3b. Further, the systems may operate consistent with that discussed below in relation to FIGS. 5a-5b.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
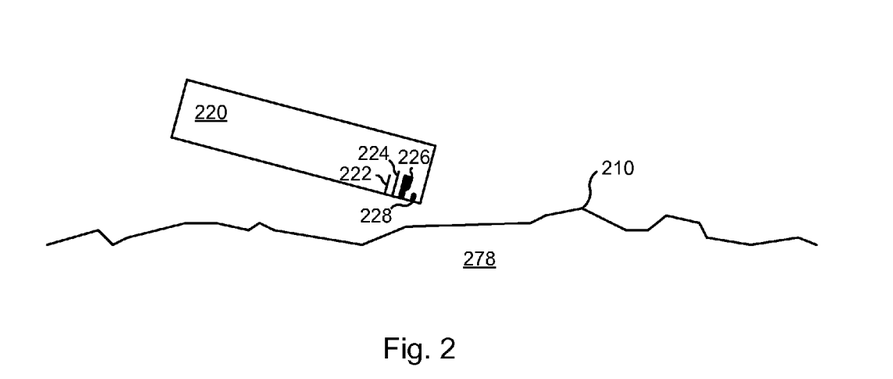
FIG. 2 graphically depicts an example read/write head disposed above the surface of a storage medium that may be used in relation to different embodiments of the present invention.

Turning to FIG. 2, a graphical depiction of an example read/write head assembly 220 disposed above a surface 210 of a storage medium 278 that may be used in relation to different embodiments of the present invention. As shown, read write head assembly 220 includes a heater element 222 that is operable to control a distance between read write head assembly 220 and surface 210, a read/write head 226 operable to generate magnetic fields to store information on surface 210 and to sense magnetic information previously stored on surface 210, and a head disk interface sensor 228 operable to sense contact between read/write head assembly 220 and surface 210.

Figure 3A:
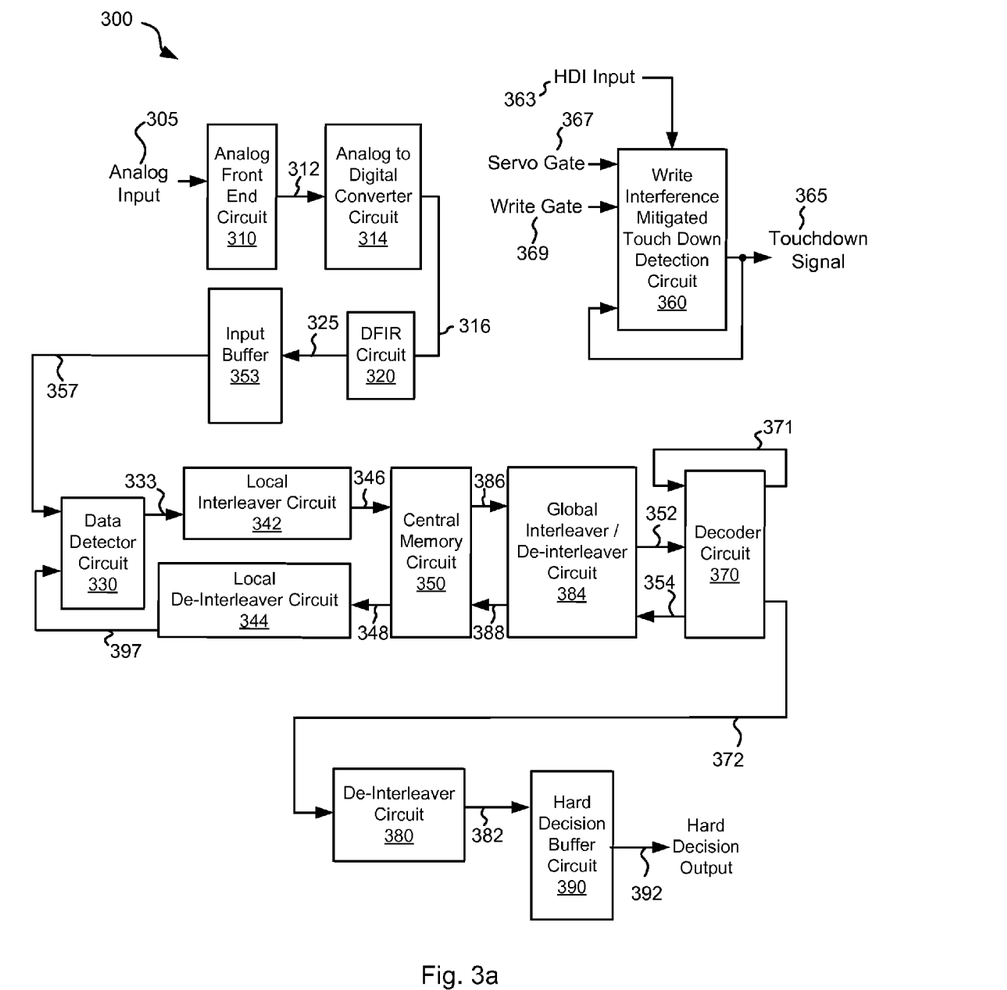
FIG. 3a shows a data processing circuit including a write interference mitigated touch down circuit in accordance with some embodiments of the present invention.

Turning to FIG. 3a, a data processing circuit 300 is shown that includes a write interference mitigated touch down circuit 360 in accordance with some embodiments of the present invention. Data processing circuit 300 includes an analog front end circuit 310 that receives an analog signal 305. Analog front end circuit 310 processes analog signal 305 and provides a processed analog signal 312 to an analog to digital converter circuit 314. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog signal 305 is derived from a read/write head assembly (not shown) that is disposed in relation to a storage medium (not shown). In other cases, analog signal 305 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 305 may be derived.

Analog to digital converter circuit 314 converts processed analog signal 312 into a corresponding series of digital samples 316. Analog to digital converter circuit 314 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 316 are provided to an equalizer circuit 320. Equalizer circuit 320 applies an equalization algorithm to digital samples 316 to yield an equalized output 325. In some embodiments of the present invention, equalizer circuit 320 is a digital finite impulse response filter circuit as are known in the art. It may be possible that equalized output 325 may be received directly from a storage device in, for example, a solid state storage system. In such cases, analog front end circuit 310, analog to digital converter circuit 314 and equalizer circuit 320 may be eliminated where the data is received as a digital data input. Equalized output 325 is stored to an input buffer 353 that includes sufficient memory to maintain a number of codewords until processing of that codeword is completed through a data detector circuit 330 and decoder circuit 370 including, where warranted, multiple global iterations (passes through both data detector circuit 330 and decoder circuit 370) and/or local iterations (passes through decoder circuit 370 during a given global iteration). An output 357 is provided to data detector circuit 330.

Data detector circuit 330 may be a single data detector circuit or may be two or more data detector circuits operating in parallel on different codewords. Whether it is a single data detector circuit or a number of data detector circuits operating in parallel, data detector circuit 330 is operable to apply a data detection algorithm to a received codeword or data set. In some embodiments of the present invention, data detector circuit 330 is a Viterbi algorithm data detector circuit as are known in the art. In other embodiments of the present invention, data detector circuit 330 is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. In some cases, one data detector circuit included in data detector circuit 330 is used to apply the data detection algorithm to the received codeword for a first global iteration applied to the received codeword, and another data detector circuit included in data detector circuit 330 is operable apply the data detection algorithm to the received codeword guided by a decoded output accessed from a central memory circuit 350 on subsequent global iterations.

Upon completion of application of the data detection algorithm to the received codeword on the first global iteration, data detector circuit 330 provides a detector output 333. Detector output 333 includes soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art. Detector output 333 is provided to a local interleaver circuit 342. Local interleaver circuit 342 is operable to shuffle sub-portions (i.e., local chunks) of the data set included as detected output and provides an interleaved codeword 346 that is stored to central memory circuit 350. Interleaver circuit 342 may be any circuit known in the art that is capable of shuffling data sets to yield a re-arranged data set. Interleaved codeword 346 is stored to central memory circuit 350.

Once decoder circuit 370 is available, a previously stored interleaved codeword 346 is accessed from central memory circuit 350 as a stored codeword 386 and globally interleaved by a global interleaver/de-interleaver circuit 384. Global interleaver/de-interleaver circuit 384 may be any circuit known in the art that is capable of globally rearranging codewords. Global interleaver/De-interleaver circuit 384 provides a decoder input 352 into decoder circuit 370. In some embodiments of the present invention, the data decode algorithm is a layered low density parity check algorithm as are known in the art. In other embodiments of the present invention, the data decode algorithm is a non-layered low density parity check algorithm as are known in the art.

Where decoded output 371 fails to converge (i.e., fails to yield the originally written data set) and a number of local iterations through decoder circuit 370 exceeds a threshold, the resulting decoded output is provided as a decoded output 354 back to central memory circuit 350 where it is stored awaiting another global iteration through a data detector circuit included in data detector circuit 330. Prior to storage of decoded output 354 to central memory circuit 350, decoded output 354 is globally de-interleaved to yield a globally de-interleaved output 388 that is stored to central memory circuit 350. The global de-interleaving reverses the global interleaving earlier applied to stored codeword 386 to yield decoder input 352. When a data detector circuit included in data detector circuit 330 becomes available, a previously stored de-interleaved output 388 is accessed from central memory circuit 350 and locally de-interleaved by a de-interleaver circuit 344. De-interleaver circuit 344 re-arranges decoder output 348 to reverse the shuffling originally performed by interleaver circuit 342. A resulting de-interleaved output 397 is provided to data detector circuit 330 where it is used to guide subsequent detection of a corresponding data set previously received as equalized output 325.

Alternatively, where the decoded output converges (i.e., yields the originally written data set), the resulting decoded output is provided as an output codeword 372 to a de-interleaver circuit 380 that rearranges the data to reverse both the global and local interleaving applied to the data to yield a de-interleaved output 382. De-interleaved output 382 is provided to a hard decision buffer circuit 390 that arranges the received codeword along with other previously received codewords in an order expected by a requesting host processor. The resulting output is provided as a hard decision output 392.

Decoder circuit 370 is designed to accept codewords that are not constrained by a '1' symbol in the final circulant in the codeword. This is facilitated by using a standard non-binary, low density parity check decoder circuit that is augmented to include an inverse mapping circuit to adjust a soft data output to compensate for the non-constrained circulant. Such an approach utilizes only a relatively small amount of additional circuitry, but results in an increased distance between possible accepted decoded outputs thereby reducing the likelihood of a mis-correction. One example implementation of decoder circuit 370 is described below in relation to FIG. 4 below.

In addition, data processing circuit 300 includes write interference mitigated touch down circuit 360 that is operable to assert a touch down signal 365 when contact between a read/write head assembly and a storage medium is sensed. Write interference mitigated touch down circuit 360 receives a head/disk interface ("HDI") input 363 that represents a temperature of a read/write head assembly. When a read/write head assembly contacts a storage medium, there is a dramatic increase in temperature of the read/write head assembly that causes a corresponding dramatic change in HDI input 363. The assertion of a write gate 369 indicates a write to a storage medium is underway. Based upon this, write interference mitigated touch down circuit 360 mitigates interference in HDI input 363 from write data (magnetic fields) that is generated during a write process.

Figure 4A:
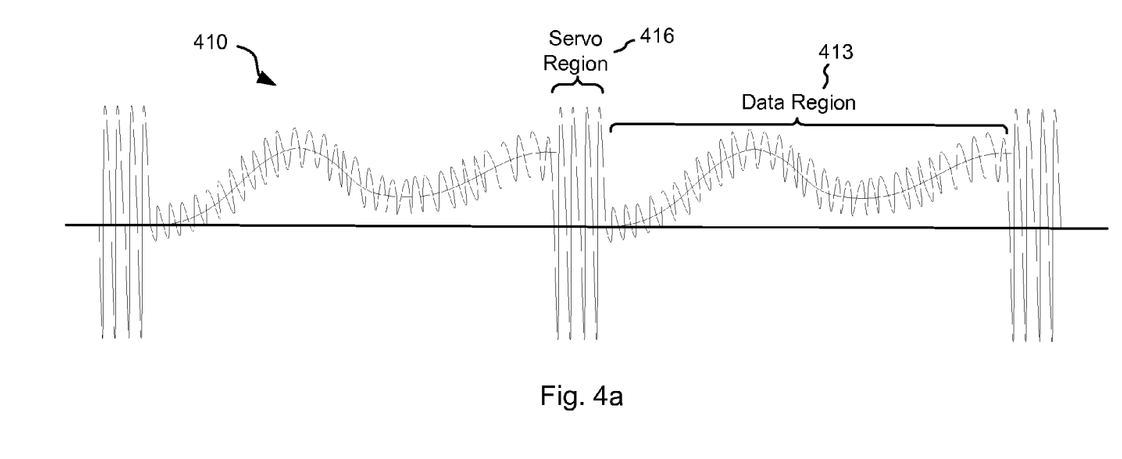
FIGS. 4a-4c graphically depict example signal outputs showing different stages of signal development in accordance with one or more embodiments of the present invention.
Figure 4B:
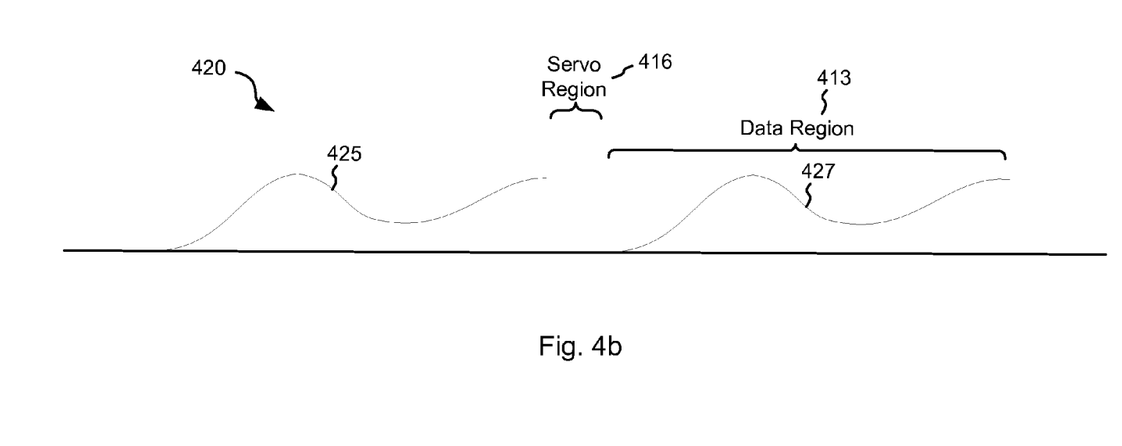
Figure 4C:
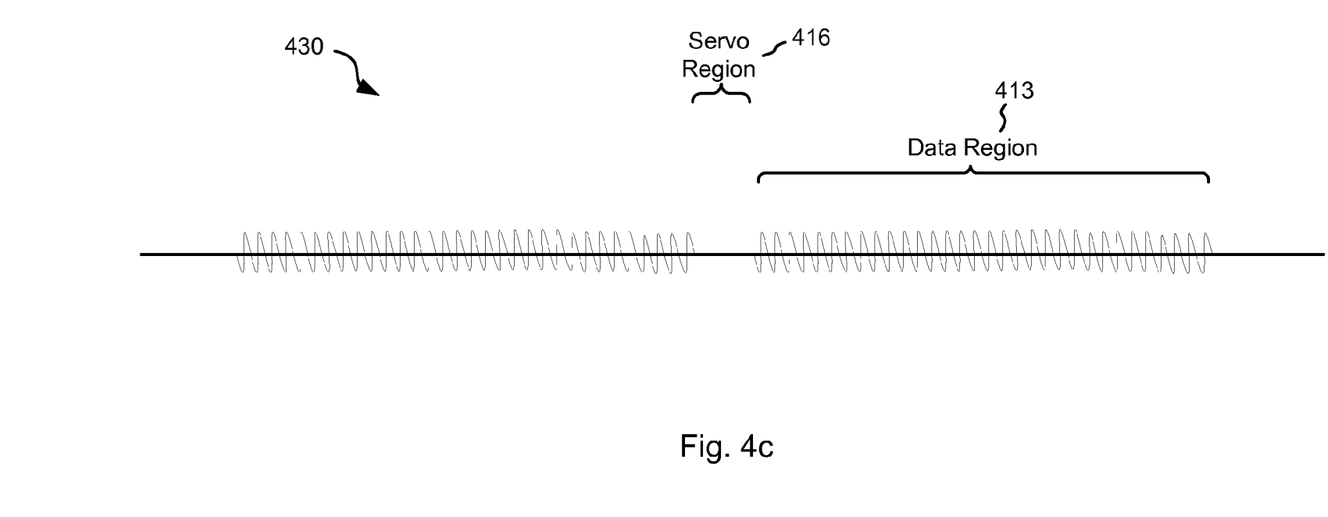

Turning to FIGS. 4a-4c, the processing of an HDI input is graphically depicted showing three scenarios. First, in FIG. 4a, a non-contact scenario 410 is shown including a servo region 416 and a data region 413. As shown, non-contact scenario includes an HDI signal from a head disk interface sensor with an amplitude sufficient to indicate contact. The amplitude is increased above what the HDI signal is expected to be due to interference due to magnetic write signals generated by a read/write head near the head disk interface sensor. Second, in FIG. 4b, a filtered version 420 of non-contact scenario 410 is shown where the HDI signal corresponding to servo region 416 is filtered out using servo gate input 367. In addition, a write interference portion 425, 427 of data region 413 is separated from the overall signal. Third, in FIG. 4c, a write interference mitigated HDI output 430 shows write interference portions 425, 427 subtracted from the data regions 413 of the non-contact scenario 410. As shown, the amplitude of write interference mitigated HDI output 430 is substantially less than that shown in FIG. 4a and more in line with what the HDI signal would be in a non-contact scenario.

Returning to FIG. 3a, in some cases, write interference mitigated touch down circuit 360 includes an energy based head touch down sensor (not shown) as is more fully described in U.S. patent application Ser. No. 13/894,680 entitled "Systems and Methods for Energy Based Head Contact Detection", and filed by Song et al. on a date even herewith. In such cases, the data region is indicated when servo gate input 367 is asserted low. The energy based head touch down sensor calculates an energy threshold to which the energy of HDI input 363 is compared. Where the energy of HDI input 363 is greater than the calculated energy threshold, touch down signal 365 is asserted indicating contact between the read/write head assembly and the storage medium. Otherwise, where HDI input 363 is less than the calculated energy threshold, touch down signal 365 is not asserted.

Figure 3B:
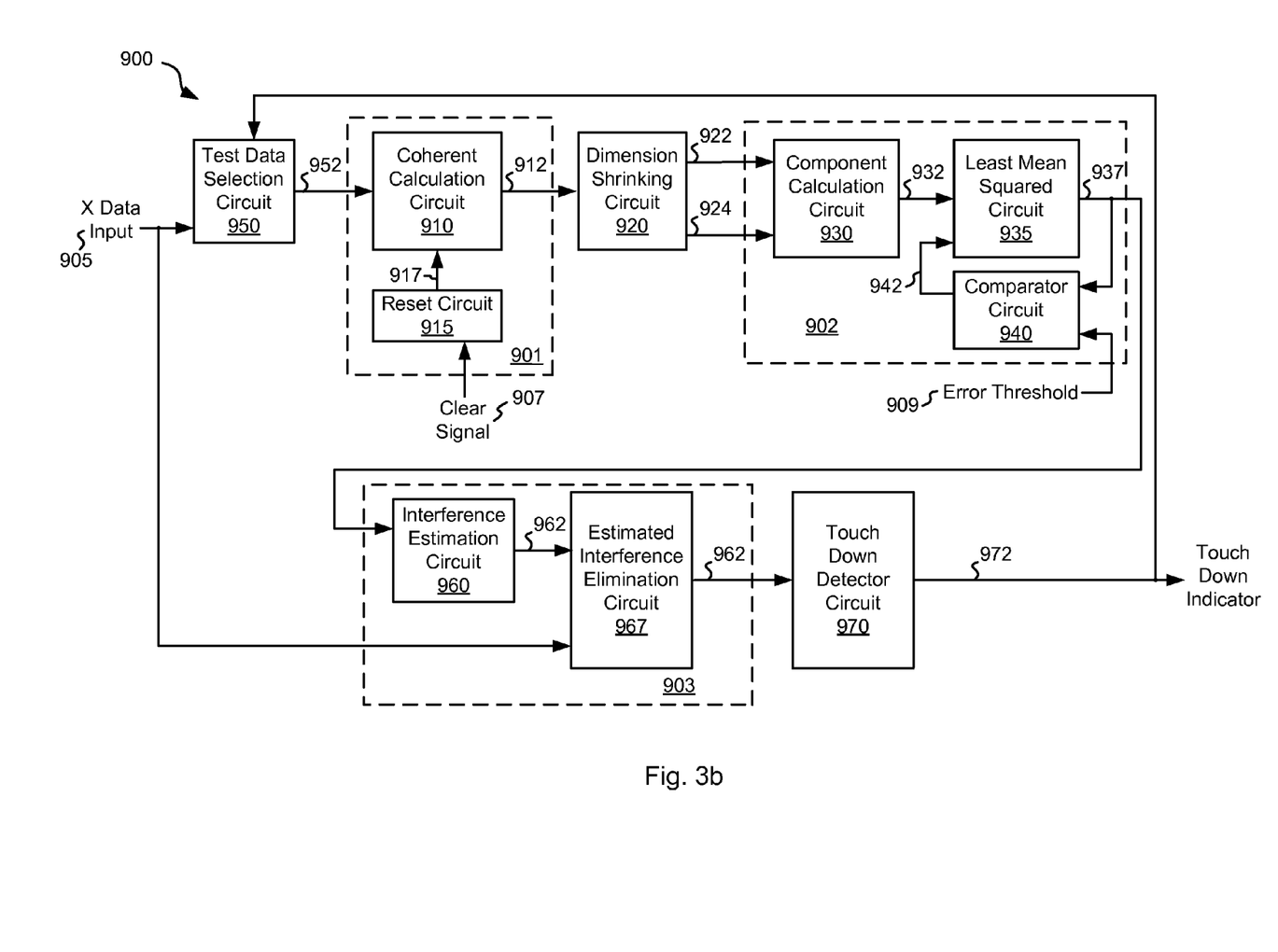
FIG. 3b shows an implementation of the write interference mitigated touch down circuit in accordance with various embodiments of the present invention.

Turning to FIG. 3b, one implementation of write interference mitigated touch down circuit 360 of FIG. 3a is shown in accordance with various embodiments of the present invention. A write interference mitigated touch down circuit 900 is shown that includes a coherent combination circuit 901, a dimension shrinking circuit 920, a least mean squared calculation circuit 902, an interference elimination circuit 903, a test data selection circuit 950, and a touch down detector circuit 970. As previously mentioned, touch down detector circuit 970 may be implemented similar to that disclosed in the previously incorporated patent application entitled "Systems and Methods for Energy Based Head Contact Detection" that asserts a touch down indicator 972 based upon a filtered HDI signal 969. In other cases, touch down detector circuit 970 may be a simple comparator circuit that compares a filtered HDI signal 969 with a threshold value, and where filtered HDI signal 969 exceeds the threshold value a touch down indicator 972 is asserted.

Test data selection circuit 950 is operable to feed an X-data input 905 that is derived when the read/write head assembly is guaranteed not to be in contact with the storage medium. The resulting data from the HDI sensor during this period is referred to as training data and is provided as a data input 952 to coherent combination circuit 901. At other times when training is not underway, test data selection circuit 950 feeds X-data input 905 that is derived when the read/write head assembly is not guaranteed to not be in contact with the storage medium. The resulting data from the HDI sensor during this period is referred to as test data and is provided as a data input 952 to coherent combination circuit 901. Of note, when touch down indicator 972 is asserted, test data selection circuit 950 does not provide data input 952 to avoid introducing contact information included in X-data input 905 to an estimated write interference value 962.

Coherent combination circuit 901 coherently combines the HDI signal (received as X-data input 905) across a number of wedges (i.e., user data regions separated by servo regions) to yield a coherent output 912. In particular, coherent combination circuit 901 includes a coherent calculation circuit 910 and a reset circuit 915. Coherent calculation circuit 910 calculates coherent output 912 (z[n]) in accordance with the following equation:

$$\text{Coherent Output 912 } (z[n]) = \frac{1}{M} \sum_{i=1}^{M} \text{Data Input } 952_i.$$

Such a running average may be implemented using a hardware efficient approach consistent with the following equation:

$$z[n] = \frac{1}{M+1}(z[n]*M + \text{Data Input 952}),$$

where M is incremented as each instance of data input 952 is incorporated into the running average. Again, data input 952 is only included in the aforementioned calculation when a non-contact situation (indicated by de-assertion of touch down indicator 972). Reset circuit 915 receives a clear signal 907, and upon receiving clear signal 907, reset circuit 915 resets both M and data input 952. This allows coherent combination circuit 901 to track slow varying interference caused by writing via the read/write head disposed near the head disk interface sensor.

Coherent output 912 includes a substantial amount of data that directly correlates to a sampling frequency of received data. Application of a least mean squares algorithm to such a substantial amount of data results in a complex and costly computational load. To avoid having to operate on an unwieldy amount of data, dimension shrinking circuit 920 transforms coherent output 912 from a z[n] space into a u[n] space. The dimension of the data in the z[n] space a power of P as shown in the following equations:

$$z[1] = a_0 + a_1(\Delta t) + a_2(\Delta t)^2 + \ldots + a_P(\Delta t)^P + v[1];$$

$$z[2] = a_0 + a_1(2\Delta t) + a_2(2\Delta t)^2 + \ldots + a_P(2\Delta t)^P + v[2];$$

$$z[2] = a_0 + a_1(n\Delta t) + a_2(n\Delta t)^2 + \ldots + a_P(n\Delta t)^P + v[n].$$

The preceding equations may be recast as follows:

$$z = Ha + v.$$

Dimension shrinking circuit 920 recasts coherent output 912 in accordance with the following equation:

$$u = Ga + \tilde{v},$$

based upon a transform defined by the following equation:

$$H^T z = H^T H a + H^T v.$$

Such an approach reduces the power of P dimension of the z[n] space to a P+1 dimension exhibited by the u[n] space.

In particular, dimension shrinking circuit 920 calculates u and g components in accordance with the following equations:

$$g_{p,k} = \sum_{i=1}^{N}(i\Delta t)^{P+k-2}; \text{ and}$$

$$u_p = \sum_{i=1}^{N}(i\Delta t)^{P-1} z[i].$$

In one particular embodiment of the present invention, P is selected as nine (9). Based upon the disclosure provided herein, one of ordinary skill in the art will recognize other values of P that may be used in relation to different embodiments of the present invention. $u_p$ is provided as a space converted output 922, and $g_{p,k}$ is provided as space converted output 924.

Space converted output 922 and space converted output 924 are provided to least mean squared calculation circuit 902. Least mean squared calculation circuit 902 is an efficient reformulation of the following least mean squared algorithm:

$$a_k := a_k - \lambda \sum_{p=1}^{P+1} g_{p,k}\left[u_p - \sum_{l=1}^{P+1} g_{p,l} a_l\right]; \text{ and}$$

$$a_k := a_k - \lambda \left[\sum_{p=1}^{P+1} g_{p,k} u_p - \sum_{l=1}^{P+1} a_l \sum_{p=1}^{P+1} g_{p,k} g_{p,l}\right].$$

The aforementioned equation can be recast as:

$$a_k := a_k - \lambda \left[c_k - \sum_{l=1}^{P+1} a_l d_l\right], \text{ where}$$

$$c_k = \sum_{p=1}^{P+1} g_{p,k} u_p, \text{ and } d_l = \sum_{p=1}^{P+1} g_{p,k} g_{p,l}.$$

To implement the aforementioned equations, least mean squared calculation circuit 902 includes a component calculation circuit 930, a least mean squared circuit 935, and a comparator circuit 940. Component calculation circuit 930 sums a product of space converted output 922 and space converted output 924 over the dimension of the u[n] space in accordance with the following equation:

$$c_k = \sum_{p=1}^{P+1}(g_{p,k})(u_p); \text{ and}$$

$$d_l = \sum_{p=1}^{P+1}(g_{p,k})(g_{p,l}).$$

$C_k$ and $d_l$ are provided as a component output 932 to least mean squared circuit 935 where they are used to calculate a current least mean squared value 937 in accordance with the following equation:

Least Mean Squared Value 937 =

$$\text{Least Mean Squared Value } 937 - \lambda\left[c_k - \sum_{l=1}^{P+1} a_l d_l\right].$$

Least mean squared value 937 is provided to comparator circuit 940 where it is compared with an error threshold value 909. Error threshold value 909 may be either user programmable or fixed depending upon the particular implementation. Recalculation of least mean squared value 937 continues until it is below error threshold 909.

In addition, least mean squared value 937 is provided to touch down detection circuit 903. Touch down detection circuit 903 includes an interference estimation circuit 960 and an estimated interference elimination circuit 960. Interference estimation circuit 960 calculates an estimated interference 962 in accordance with the following equation:

$$\text{Estimated Interference } 962 = \sum_{p=0}^{P} \text{least mean squared value } 937_p (n\Delta t)^P.$$

Estimated interference 962 corresponds to the signal discussed in relation to FIG. 4b. Estimated interference 962 is provided to estimated interference elimination circuit 967 that subtracts the estimated interference from X-data input 905 to yield filtered HDI signal 969. Filtered HDI signal 969 corresponds to the signal discussed in relation to FIG. 4c. As mentioned above, filtered HDI signal 969 is provided to touch down detector circuit 970 where it is used to determine touch down indicator 972.

Figure 5A:
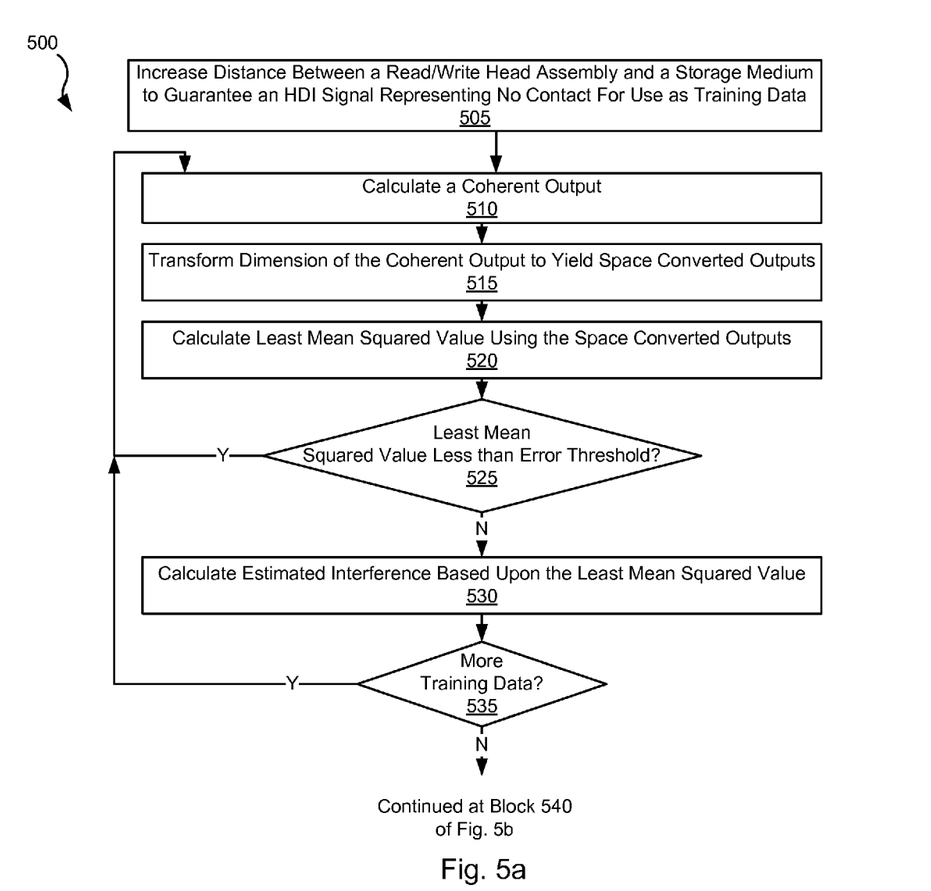
FIGS. 5a-5b is a flow diagram showing a method for contact detection in accordance with some embodiments of the present invention.
Figure 5B:
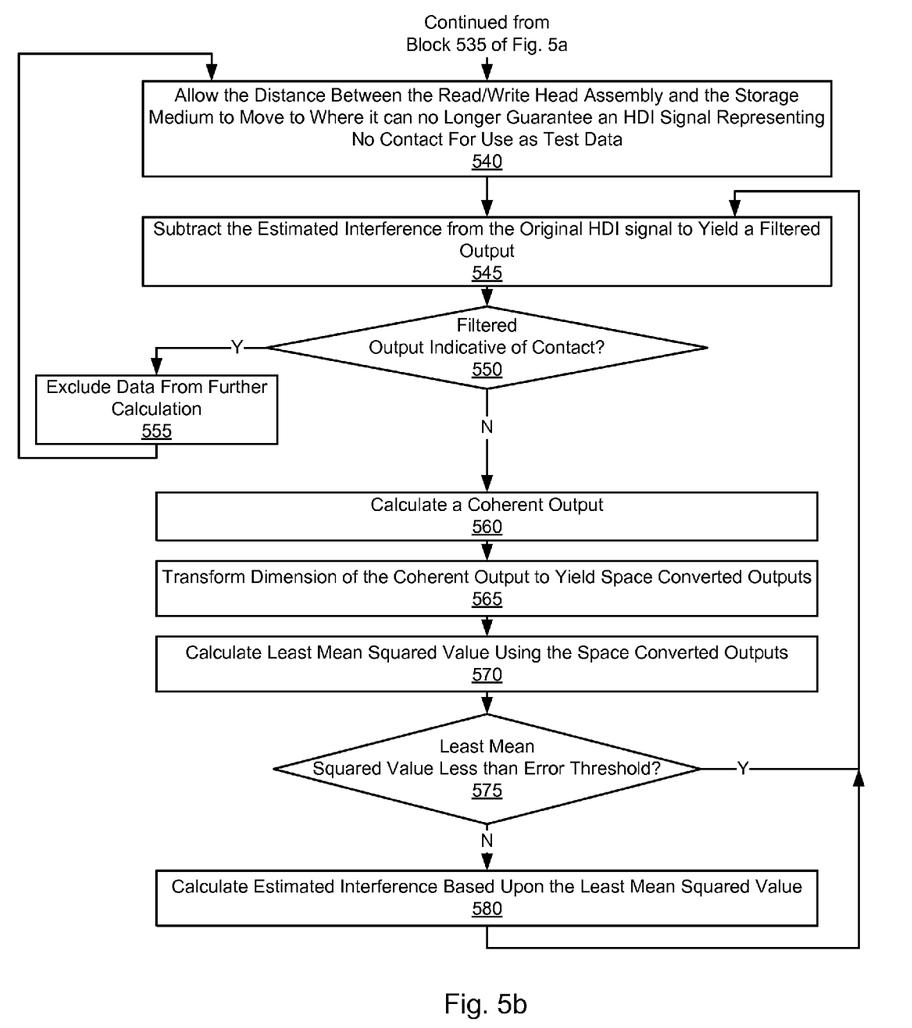

Turning to FIGS. 5a-5b, a flow diagram 500 shows a method for contact detection in accordance with some embodiments of the present invention. Turning specifically to FIG. 5a and following flow diagram 500, a distance between the read/write head assembly and the storage medium is increased to guarantee an HDI signal represents no contact for use as training data (block 505). By increasing the distance, it can be assure that the data received as the HDI signal does not include any signal indicative of a contact as in the absence of interference, the HDI signal should be approximately zero. Thus, any signal greater than zero that provided as the HDI signal during this period is likely due to interference. This interference may be from magnetization of the write head.

A coherent output is calculated based upon the received HDI signal in accordance with the following equation (block 510):

$$\text{Coherent Output } (z[n]) = \frac{1}{M} \sum_{i=1}^{M} HDI \text{ Signal}_i.$$

Such a running average may be implemented using a hardware efficient approach consistent with the following equation:

$$z[n] = \frac{1}{M+1}(z[n] * M + HDI \text{ Signal}),$$

where M is incremented as each instance of the HDI signal is incorporated into the running average.

The coherent output is transformed to a different space to minimize the dimension (block 515). This conversion may be from the preceding z[n] space to a u[n] space in accordance with the following process:

$$z[1] = a_0 + a_1(\Delta t) + a_2(\Delta t)^2 + \ldots + a_P(\Delta t)^P + v[1];$$

$$z[2] = a_0 + a_1(2\Delta t) + a_2(2\Delta t)^2 + \ldots + a_P(2\Delta t)^P + v[2];$$

$$z[2] = a_0 + a_1(n\Delta t) + a_2(n\Delta t)^2 + \ldots + a_P(n\Delta t)^P + v[n].$$

As noted in the preceding equation, the dimension of the z[n] space is P. The preceding equations may be recast as follows:

$$z = Ha + v.$$

Based upon this, the following equation may be used to perform the dimension transform:

$$u = Ga + \tilde{v},$$

based upon a transform defined by the following equation:

$$H^T z = H^T H a + H^T v.$$

Such an approach reduces the power of P dimension of the z[n] space to a P+1 dimension exhibited by the u[n] space. In particular, the dimension transform may be implemented by calculating u and g components in accordance with the following equations:

$$g_{p,k} = \sum_{i=1}^{N} (i\Delta t)^{P+k-2}; \text{ and}$$

$$u_p = \sum_{i=1}^{N} (i\Delta t)^{P-1} z[i].$$

In one particular embodiment of the present invention, P is selected as nine (9). Based upon the disclosure provided herein, one of ordinary skill in the art will recognize other values of P that may be used in relation to different embodiments of the present invention.

Using the aforementioned u and g components a least mean squared value is calculated (block 520). This calculation may be done in accordance with the following equations:

$$c_k = \sum_{p=1}^{P+1} (g_{p,k})(u_p);$$

$$d_l = \sum_{p=1}^{P+1} (g_{p,k})(g_{p,l}).$$

Using the aforementioned $C_k$ and $d_l$ elements the least mean squared value is calculated in accordance with the following iterative equation:

Least Mean Squared Value =

$$\text{Least Mean Squared Value} - \lambda \left[ c_k - \sum_{l=1}^{P+1} a_l d_l \right].$$

The least mean squared value is compared with an error threshold value (block 525). Where the least mean squared value is greater than the error threshold value (block 525), the processes of blocks 510-525 are repeated. Alternatively, where the least mean squared value is greater than the error threshold value (block 525), an estimated interference in the HDI signal is calculated based upon the least mean squared value (block 530). The estimated interference is calculated in accordance with one or more embodiments of the present invention:

$$\text{Estimated Interference} = \sum_{p=0}^{P} \text{least mean squared value}_p (n\Delta t)^P.$$

It is then determined whether more training data (i.e., data generated when the read/write head assembly is a substantial difference from the storage device) is to be processed (block 535). Where additional training information is to be processed (block 535), the processes beginning at block 510 are performed for the next instance of data received.

Alternatively, where no additional training data remains to be processed (block 535), the processes beginning on FIG. 5b begins. Turning to FIG. 5b, the distance between the read/write head assembly and the storage medium is allowed to move such that a no contact condition can no longer be guaranteed (block 540). As such, the received HDI signal may include contact information in addition to any interference. The previously calculated estimated interference is subtracted from the original HDI signal to yield a filtered output (block 545). The filtered output is substantially limited to only data indicative of a contact scenario. This filtered output is compared with a contact threshold value to determine whether the read/write head assembly came into contact with the storage medium (block 550). Where the filtered output is greater than the threshold value, therefore indicating contact (block 550), the recently received data is excluded from inclusion in updating the estimated interference (block 555) and the processes of blocks 540-550 are repeated. In addition, while not shown in a specific block, a contact indicator is provided as an output.

Alternatively, where the filtered output is less than or equal to the threshold value, therefore indicating no contact (block 550), the recently received data is used to update the estimated interference. In particular, a coherent output is calculated based upon the received HDI signal in accordance with the following equation (block 560). This coherent output is calculated the same way it was calculated in block 510 above. The coherent output is then transformed to a different space to minimize the dimension (block 565). This transform may be done similar to that discussed above in relation to block 515. A least mean squared value is then calculated using the space converted outputs (block 570). This calculation may be done similar to that discussed above in relation to block 520. It is then determined whether the least mean squared value is less than the error threshold (block 575). Where the least mean squared value is greater than or equal to the error threshold (block 575), the processes beginning at block 545 are repeated. Alternatively, where the least mean squared value is less than the error threshold (block 575), the estimated interference is updated based on the least mean squared value (block 580). The estimated interference may be updated consistent with that discussed above in relation to block 530.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A storage device, the storage device comprising:
a read/write head assembly disposed in relation to a storage medium, wherein the read/write head assembly includes a sensor operable to provide a sensor output indicating contact between the read/write head assembly and the storage medium and a write head; and
an interference mitigated touch down circuit operable to:
estimate an interference in the sensor output from the write head, wherein estimating the interference in the sensor output includes calculating a coherent output based upon two or more instances of the sensor output; and
remove the interference from the sensor output to yield a filtered output.

2. The storage device of claim 1, wherein the storage device further comprises:
the storage medium.

3. The storage device of claim 1, wherein the interference mitigated touch down circuit is further operable to:
determine a contact between the storage medium and the read/write head assembly based on the filtered output; and
provide a contact output.

4. The storage device of claim 1, wherein estimating the interference in the sensor output further comprises:
calculating a least mean squared value based at least in part on the coherent output.

5. The storage device of claim 4, wherein the coherent output is a running average of the two or more instances of the sensor output.

6. The storage device of claim 4, wherein estimating the interference in the sensor output further comprises:
transforming the dimension of the coherent output from a first space to a second space; and
wherein calculating a least mean squared value is based at least in part on the coherent output transformed to the second space.

7. The storage device of claim 6, wherein the first dimension is a power of P.

8. The storage device of claim 7, wherein the value of P is nine.

9. The storage device of claim 1, wherein removing the interference from the sensor output comprises:
subtracting the interference from the sensor output to yield the filtered output.

10. The storage device of claim 1, wherein the interference mitigated touch down circuit is implemented as part of a semiconductor device.

11. The storage device of claim 1, wherein the storage device is a hard disk drive.

12. The storage device of claim 1, wherein the sensor output changes as a function of a temperature of the read/write head assembly.

13. A contact detection system, the system comprising:
an interference mitigated touch down circuit operable to:
receive a sensor output indicating a contact between a read/write head assembly and a storage medium;
estimate an interference in the sensor output from a write head included in the read/write head assembly, wherein estimating the interference in the sensor output includes:
calculating a coherent output based upon two or more instance of the sensor output; and
calculating a least mean squared value based at least in part on the coherent output; and remove the interference from the sensor output to yield a filtered output.

14. The contact detection system of claim 13, wherein the contact detection system is implemented as part of a semiconductor device.

15. The contact detection system of claim 13, wherein the contact detection system is implemented as part of a storage device, and wherein the storage device further comprises:
   a storage medium; and
   a read/write head assembly disposed in relation to the storage medium, wherein the read/write head assembly includes a sensor operable to provide the sensor output indicating contact between the read/write head assembly and the storage medium.

16. The contact detection system of claim 13, wherein the interference mitigated touch down circuit is further operable to:
   determine a contact between the storage medium and the read/write head assembly based on the filtered output; and
   provide a contact output.

17. The contact detection system of claim 13, wherein the coherent output is a running average of the two or more instances of the sensor output.

18. The contact detection system of claim 13, wherein removing the interference from the sensor output comprises: subtracting the interference from the sensor output to yield the filtered output.

19. A method for contact detection, the method comprising:
   providing a read/write head assembly including a contact sensor and a write head;
   moving the read/write head a first distance from a storage medium, wherein no contact between the read/write head assembly and the storage medium occurs;
   receiving a sensor output from the contact sensor, wherein the sensor output changes as a function of a temperature of the read/write head assembly;
   estimating an interference in the sensor output from the write head; and
   moving the read/write head a second distance from a storage medium, wherein contact between the read/write head assembly and the storage medium is possible; and
   removing the interference from the sensor output to yield a filtered output.

20. The method of claim 19, wherein estimating the interference in the sensor output comprises:
   calculating a coherent output based upon two or more instance of the sensor output; and
   calculating a least mean squared value based at least in part on the coherent output.

* * * * *